United States Patent [19]
Hall

[11] Patent Number: 5,152,098
[45] Date of Patent: Oct. 6, 1992

[54] PORTABLE ELEVATED HORTICULTURAL WORK STATION

[76] Inventor: Suzanna Hall, 14021 Manchester Rd., Manchester, Mo. 63011

[21] Appl. No.: 617,630

[22] Filed: Nov. 26, 1990

[51] Int. Cl.$^5$ ............................................... A47G 7/00
[52] U.S. Cl. .......................................... 47/39; 47/71; 47/18; 220/306
[58] Field of Search .................... 47/71, 18, 81, 39; 220/306, 94 A; 108/25

[56] References Cited

U.S. PATENT DOCUMENTS

| | | | |
|---|---|---|---|
| 75,555 | 3/1868 | Lilley | 47/71 |
| 2,430,682 | 11/1947 | Merkle | 108/25 |
| 2,770,957 | 11/1956 | Bronson | 47/71 |
| 3,049,387 | 8/1962 | Schlegel | 108/25 |
| 3,127,698 | 4/1964 | Smithers | 220/306 |
| 3,246,446 | 4/1966 | Powers | 220/306 |
| 3,667,079 | 6/1972 | Hagglund | 108/25 |
| 4,206,845 | 6/1980 | Christian | 220/306 |
| 4,434,577 | 3/1984 | Holtkamp | 47/81 |

FOREIGN PATENT DOCUMENTS

| | | | |
|---|---|---|---|
| 1231761 | 10/1960 | France | 220/306 |
| 9483 | of 1884 | United Kingdom | 47/71 |
| 1173421 | 12/1969 | United Kingdom | 47/81 |
| 2204785 | 11/1988 | United Kingdom | 47/39 |

*Primary Examiner*—Henry E. Raduazo

[57] ABSTRACT

An elevated work platform for raising a potted plant to a comfortable working height and providing a work area in which tools and materials, has a generally conical raised platform and a surrounding debris collecting and storage area. The work station and lid are made of plastic and can be readily moved and cleaned. The work station provides an accumulating area in which bags of soil or other items needed for the care of plants can be placed. The work station is an improvement over makeshift arrangements and also provides a user with a collector for any runoff of excess water used to water or moisten a plant or soil.

16 Claims, 5 Drawing Sheets

PORTABLE ELEVATED HORTICULTURAL WORK STATION

BACKGROUND OF THE INVENTION

The present invention relates in general to horticulture and gardening and pertains, more particularly, to an elevated work platform for raising a potted plant to a comfortable working height and providing a work area in which tools and materials can be placed. The work station is an improvement over make-shift arrangements and also provides a user with a collector for any runoff of excess water used to water or moisten a plant or soil.

With conventional planting arrangements it is generally necessary to have sufficient work space, for example an outside or add-on greenhouse, to efficiently grow and maintain house plants. For example, it is common to have an area outside of the house in a garage or exterior green house structure for planting, maintaining, replanting and generally providing the care house plants require to thrive.

Those not fortunate to have the extra space or personal garage, for example, apartment or condominium dwellers, try to solve the problems of mess and cleanup, particularly associated with spilled soil and water by constructing makeshift work areas in a sink or bathtub. It will be recognized that the clutter remaining from a typical planting or re-potting session includes water and wet soil not adequately absorbed on paper or difficult to remove from a non-porus drop cloth without spreading the mess from the work area to the door or rubbish.

Another drawback associated with conventional makeshift arrangements is that it is difficult to readily dispose of the water spilled or splashed during the work session. This also obtains for any protective material put under the work area such as newspaper that then adds to the clutter and the clean up.

SUMMARY OF THE INVENTION

Accordingly, it is an object of the present invention to provide an improved work station that is adapted to facilitate the horticultural endeavors of those without space to dedicate to their plants. With the work station of this invention it is expected that apartment or condominium dweller will be able to cultivate their house plants with little or no extra clutter in a manner that facilitates an easy clean up after the work is completed.

Another object of the present invention is to provide an improved work station that is constructed to provide an elevated work area generally surrounded by a collection area for soil and water.

A further object of the present invention is to provide a work station that is adapted for ease of cleaning and storage when not in use.

Still another object of the present invention is to provide a portable work station that may be readily cleaned and stored even in an environment (e.g., an apartment or condominium) having limited space to accomplish either.

To accomplish the foregoing and other objects of this invention there is provided a portable elevated horticultural work station for facilitating conventional planting, maintenance, re-potting, and similar tasks. The work station comprises means for supporting a container for a plant or the like and means for accumulating material and debris in a confined space.

The confined space generally envelopes or surrounds the supporting means. The supporting means forms a collector for any refuse material that accumulates within the confined space while the plant in the container is being serviced. The supporting means is elevated relative to the collection area in order to raise the container above the debris and to bring the container to a comfortable height.

The elevated work station of the present invention is preferably adapted for resisting movement of the container once placed thereon until the container is intentionally moved by application of a non-skid material, for example foam rubber or rubber pad, to the container receiving surface.

In the disclosed embodiment described herein, there are provided a supporting means having a generally conical shape and a generally flat, truncated end for receiving the non-skid pad. The supporting means forms a hollow stacking recess for receiving another complementary supporting means when at least two work stations are stacked together. In addition, the collection area and a lid are also shaped to allow stacking of either the lids or the containers with or without lids.

Also, in the preferred embodiment the lid fastens over the work station and includes a handle member and at least one catch member.

These and other objects and features of the present invention will be better understood and appreciated from the following detailed description of one embodiment thereof, selected for purposes of illustration and shown in the accompanying drawing.

DETAILED DESCRIPTION

Figure 1:
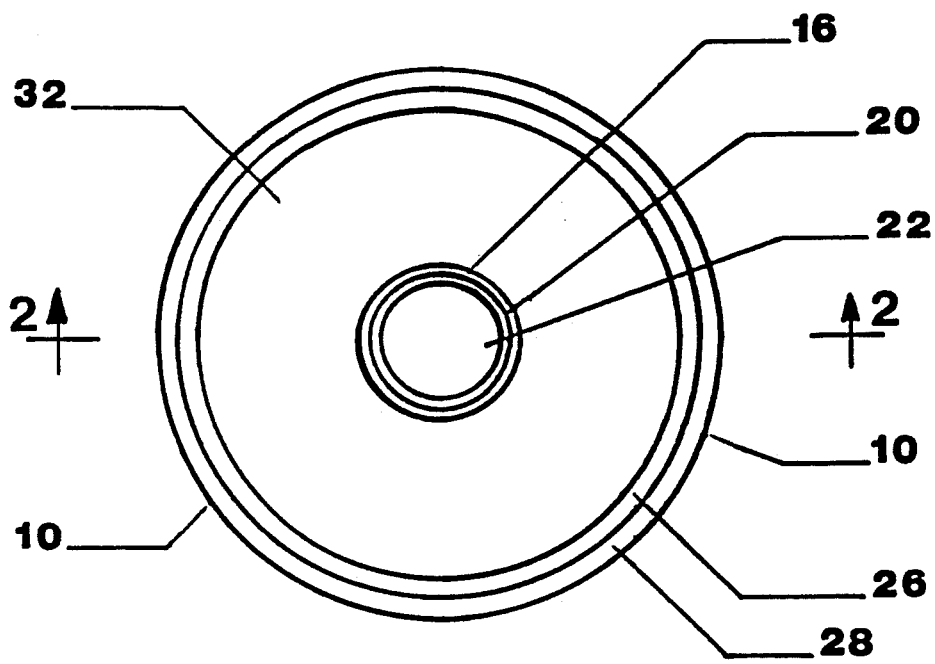
FIG. 1 is a plan view of a work station constructed in accordance with the present invention without the lid.
Figure 2:
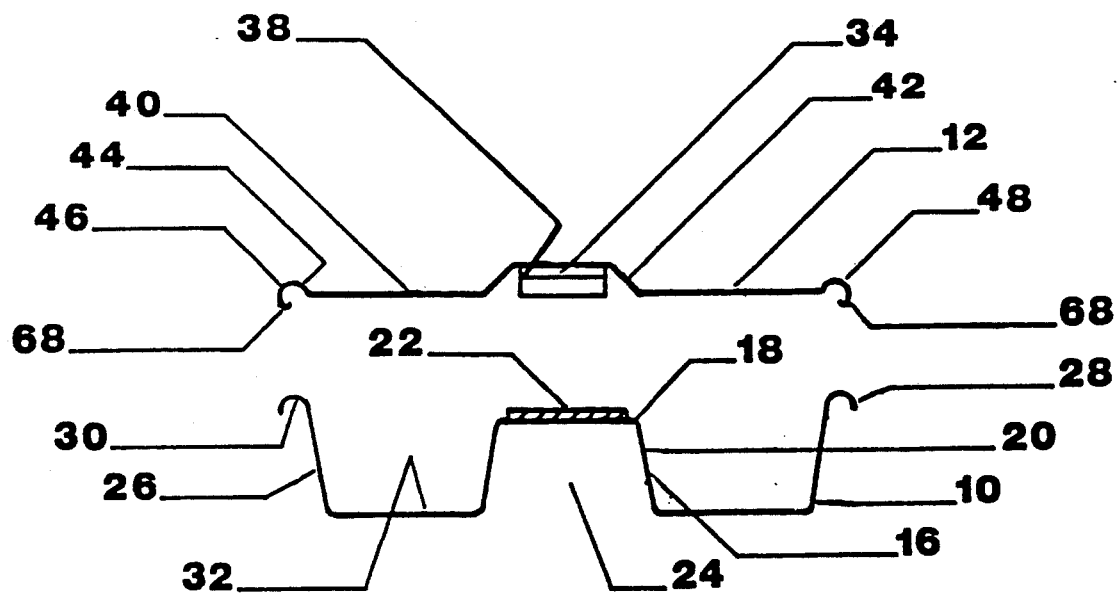
FIG. 2 is a cross-sectional view of the work station depicted in FIG. 1 and a lid.
Figure 3:
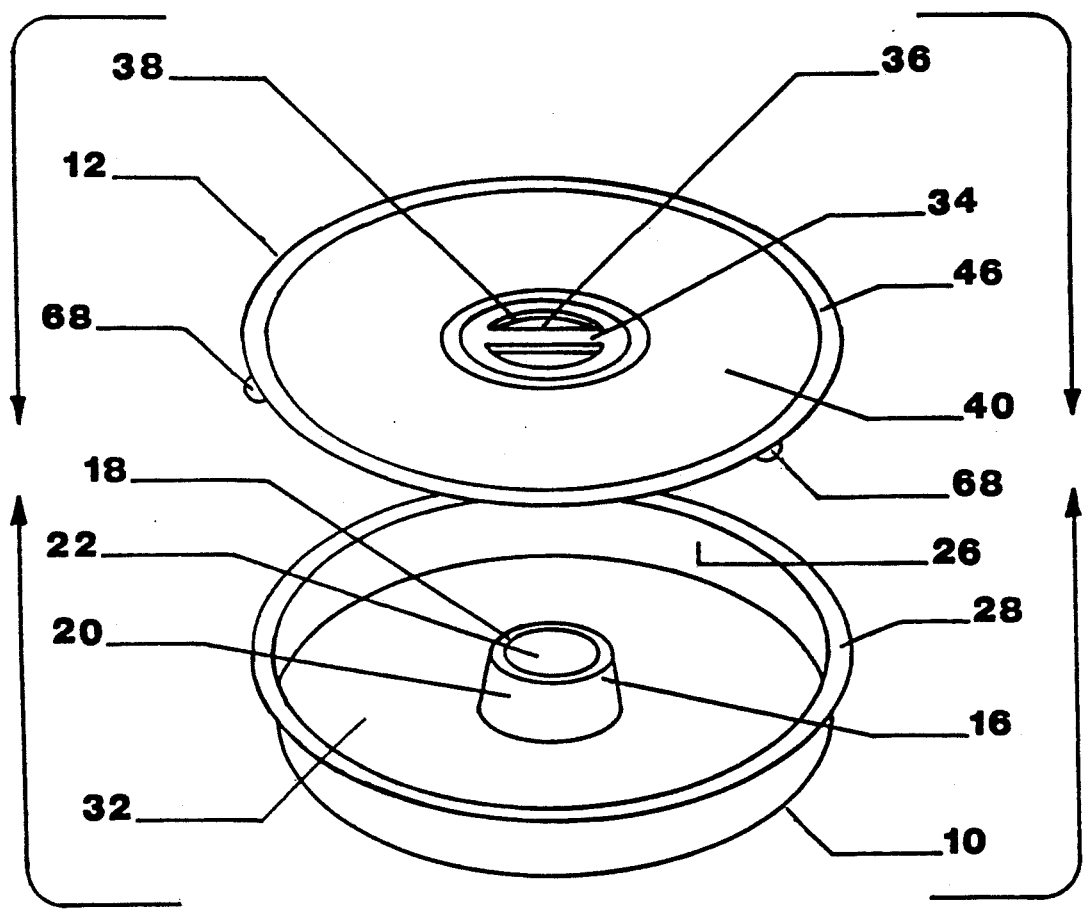
FIG. 3 is an exploded perspective view of the work station and lid.
Figure 4:
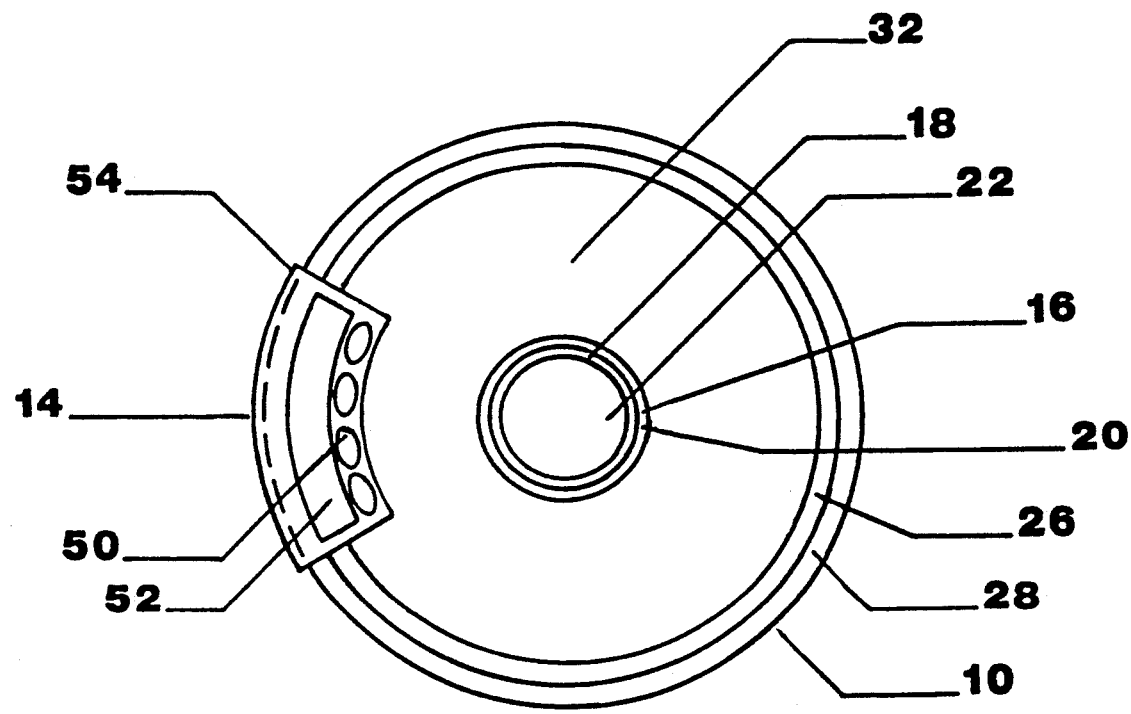
FIG. 4 is another plan view of the work station illustrated with a tool and refuse accessory.
Figure 5:
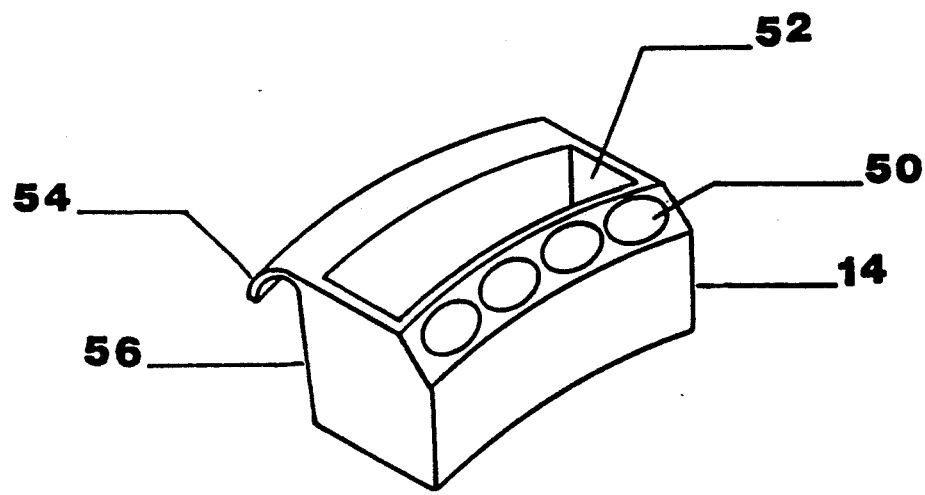
FIG. 5 is a perspective view of a preferred embodiment of the accessory illustrated in FIG. 4.

Referring now to the drawings there is shown a preferred embodiment for the elevated horticulture work station of this invention. The work station is described in connection with an apartment or condominium application to facilitate conventional interior horticulture by an occupant. The work station of the present invention is particularly adapted for reducing clutter and debris and is characterized by an improved, washable and storable work station.

The drawings show the elevated horticulture work station 10 in conjunction with a lid 12 for covering the work station and a tool organizer accessory 14. The horticulture work station includes a means for supporting a container for a plant or the like at a central island 16 having a generally conical shape. In the preferred conical embodiment a truncated top surface 18 provides a preferably flat surface on which to place the container while using the work station. The elevated support has a generally sloping side 20.

In a preferred embodiment a non-skid member 22 is placed on the surface 18. The member 22 may be foam rubber or any equivalent material that resists movement of the container once it is set in place until it is intentionally moved. Opposite the island 16 a hollow stacking recess 24 is defined.

A means for accumulating material and debris in a confined space around the island is defined by sloping side 20 and an outward sloping peripheral wall 26.

In a preferred embodiment the wall 26 terminates in a generally rolled lip portion 28 that defines another stacking recess 30 as will be discussed below. Thus, an accumulating means enveloping the supporting means and providing a bottom collection surface 32 is formed such that refuse material, water, and debris can accumulate within the confined space rather than collecting on the floor or around the work area with additional clutter.

The supporting means 16 is elevated relative to the bottom collection surface 32 for at least two reasons. First, the container is raised above the debris and water that will tend to accumulate. Secondly, the container is generally raised above the edge of wall 26 and into a position that is intended to create less strain as the container and the plant is serviced by the user of the present invention.

The lid 12 includes means for carrying the lid or the lid and the attached work station 10 and in a preferred embodiment includes a handle member 34 and an associated handle recess 36 with generally outward sloping walls 38 to facilitate the user operatively grabbing the handle.

Ease of storage is one of the secondary objects, and is accomplished in the present invention by providing in the lid 12 a stacking recess 40 with inner sloping walls 42 and peripheral sloping walls 44.

Attaching the lid 12 to the work station 10 is accomplished in a preferred embodiment by providing the walls 44 with an edge closure portion 46 incorporating a stacking recess 48 useful for saving space and storage volume when two or more lids are stacked whether in the home or in the store or warehouse as is also true for the work stations 10 themselves.

In operation, in connection with the apartment or condominium application previously mentioned to facilitate plant maintenance, the tool organizer accessory may be placed over the lip 28 of the work station 10 and a desired assortment of conventional garden tools (not shown) placed in any of the typical tool holding recesses 50. As the container is planted, watered, re-potted, or prepared for vacation, debris generated can be stored in a refuse container or bin 52 to reduce clutter within the work station 10.

Figure 9:
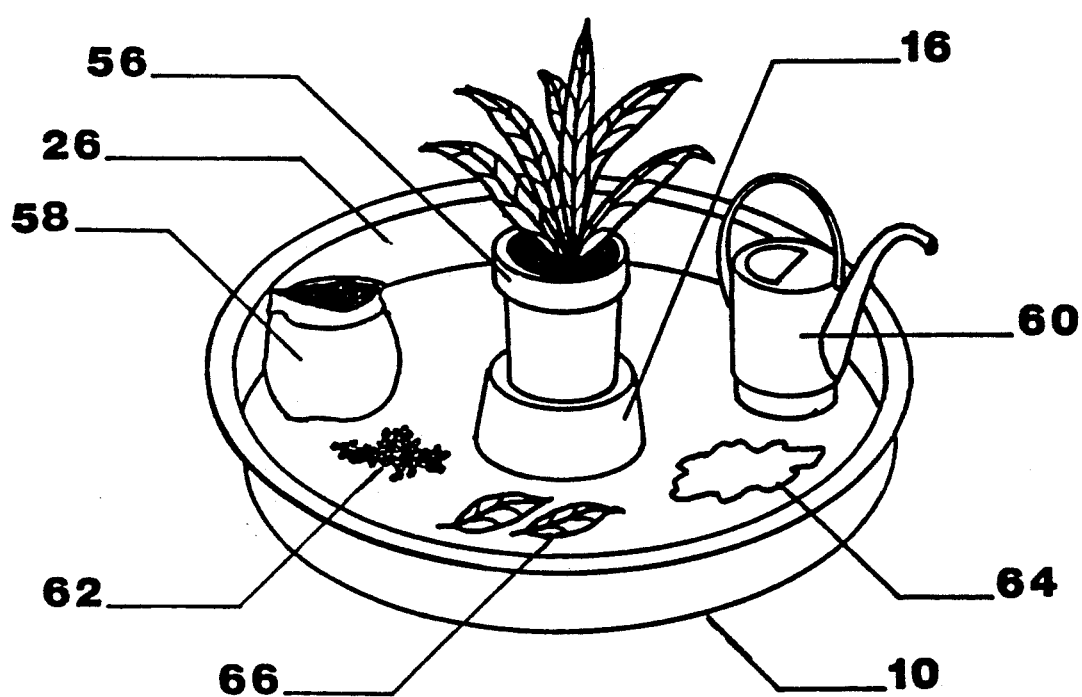
FIG. 9 is a perspective view of a preferred embodiment illustrating in use a possible arrangement of a plant in a container, materials and debris.

The accessory rests in place by means of a hook 54 over the lip 28. A plant and container 56 are shown for purposes of illustration in FIG. 9. A bag of soil 58 and a water container 60 will easily fit in a work station 10 of the appropriate size. The loose soil 62 and spilled water 64 as well as discarded leaves 66 collect as intended on surface 32.

In a preferred embodiment the lid and work station are not rigid and a conventional flexible latch member 68, for example three somewhat flexible fingers (e.g., as used on trash barrels) spaced equally around the circumference of the lid will allow the lid to be fixed in place on the work station for storage or to reduce clutter if it is desired, for example to leave extra soil or tools in the work station between uses.

From the foregoing description those skilled in the art will appreciate that all of the objects of the present invention are realized. An elevated horticulture work station is provided that facilitates the horticultural endeavors of those without extra space to dedicate to their plants and is expected to be ideal for use by the apartment or condominium dweller who will now be able to cultivate their house plants with little or no extra clutter in a manner that facilitates an easy clean up after the work is completed.

The work station is constructed to provide an elevated work area generally surrounded by a collection area for soil and water and the present invention is adapted for ease of cleaning and storage when not in use. The work station is readily portable which facilitates cleaning and storage even in an environment (e.g., an apartment or condominium) having limited space to accomplish either.

Figure 6:
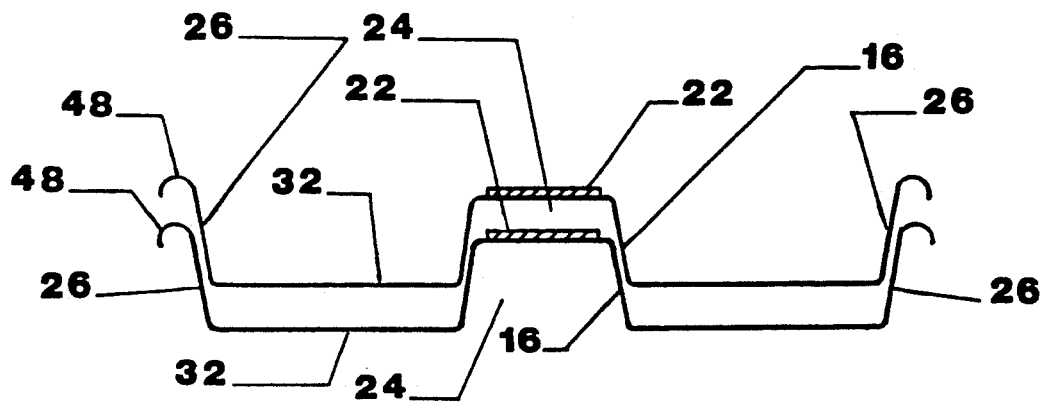
FIG. 6 is a cross-sectional view illustrating two stacked work stations.
Figure 8:
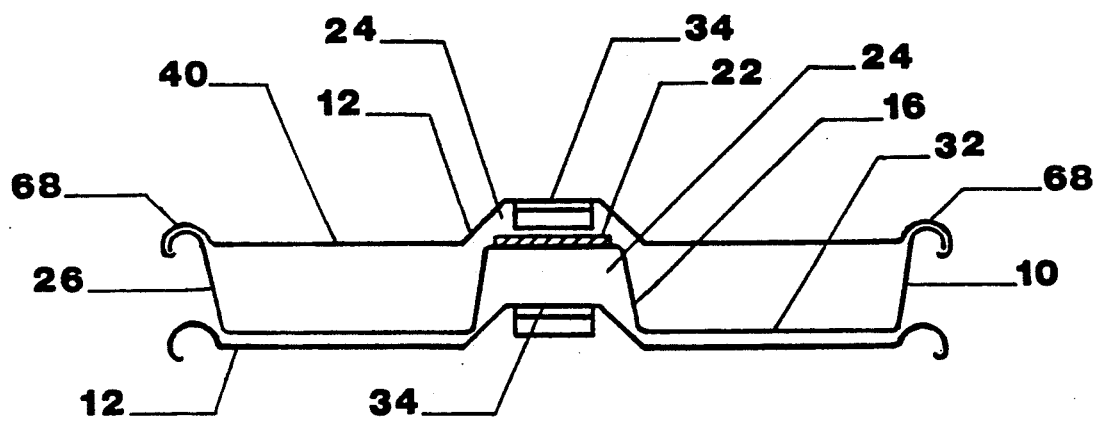
FIG. 8 is a cross-sectional view illustrating stacking work stations with lids.
Figure 7:
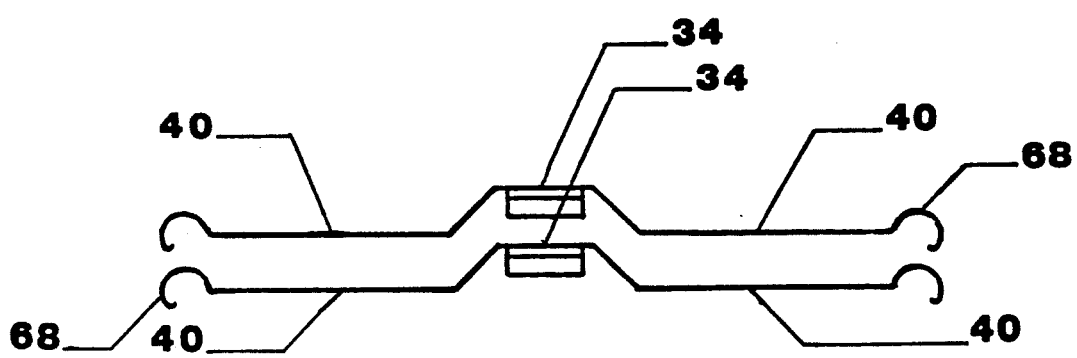
FIG. 7 is a cross-sectional view illustrating two stacked lids.

As illustrated in FIGS. 6, 7, and 8 any combination of the work station and lid can be stacked, freeing up space in residential or commercial storage locations.

While specific embodiments have been shown and described, many variations are possible. The particular shape of the work station and the lid including all of the dimensions may be changed in order to suit the overall size desired. The materials may vary although a high impact, washable, somewhat flexible plastic is preferred.

The configuration of the work station including the elevated island may vary although a preferred conical shape is illustrated and described. In another embodiment, a larger or smaller unit could be provided for professional interior landscape providers.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed:

1. A horticultural work station adapted to be ported about and set up on a table or other horizontal work surface, said work station comprising:
    (a) an elevated support means having a generally planar surface capable of supporting a wide range of different sized plant containers in a stable manner at a predetermined elevation above said work surface:
    (b) an accumulating means adapted to support plants, bags of potting soil and other items needed for the care of potted plants provided below said predetermined elevation and generally surrounding said elevated support; and
    (c) a peripheral wall surrounding said accumulating means and said elevated support, said accumulating means and said peripheral wall forming a dirt and water tight enclosure about said elevated support whereby dirt and water spilled while working on potted plants will be confined within said peripheral wall.

2. A horticulture work station as set forth in claim 1 wherein the support means includes means for resisting movement of the container once placed thereon until the container is intentionally moved.

3. A horticulture work station as set forth in claim 1 wherein the support means defines generally conical in shape.

4. A horticulture work station as set forth in claim 3 wherein the container support means is defined by a generally flat, truncated end of the generally conical support means.

5. A horticulture work station as set forth in claim 1 wherein the material accumulating means is generally defined at an interior location by the support means and at an exterior location by a generally outwardly sloping wall.

6. A horticulture work station as set forth in claim 5 wherein the support means forms a hollow stacking recess for receiving another complementary support means of another work station when the two work stations are stacked together.

7. A horticulture work station as set forth in claim 5 wherein the sloping walls of the accumulating means forms a hollow stacking recess for receiving another accumulating means when at least two work stations are stacked together.

8. A horticulture work station as set forth in claim 1 including means for covering the support means and the accumulating means.

9. A horticulture work station for providing an elevated work platform on a table or other work surface, comprising:
   (a) support means adapted to supporting a plant container the support means generally defined by an elevated conical section;
   (b) means adapted for accumulating material and debris in a confined space, the accumulating means ringing the conical section of the support means such that refuse material accumulates within a confined space defined intermediate the support means and an exterior peripheral wall member; and
   said support means being wide enough to support plants, bags of soil and other items needed for the care of potted plants, and said support means, accumulating means and the exterior peripheral wall define a dirt and water tight enclosed area above said table or other work surface.

10. An elevated horticulture work station as set forth in claim 9 wherein the container support surface is defined by a generally flat, truncated end of the generally conical elevated support section.

11. An elevated horticulture work station as set forth in claim 9 wherein the generally conical elevated support member is adapted to function as a hollow stacking recess for receiving another generally conical base when at least two elevated horticulture work stations are stacked together.

12. An elevated horticulture work station as set forth in claim 9 wherein a sloping wall of the accumulating means has been adapted to form a hollow stacking recess for receiving another accumulating means when at least two elevated horticulture work stations are stacked together.

13. An elevated horticulture work station as set forth in claim 9 including means for covering the support means and the accumulating means.

14. An elevated horticulture work station as set forth in claim 13 wherein the covering means includes a lid that has been adapted to fasten over the work station and includes a handle member.

15. An elevated horticulture work station as set forth in claim 3 wherein the cover means has been adapted to include at least one catch member.

16. An elevated horticulture work station as set forth in claim 13 wherein the cover means has been adapted to include means for receiving another cover means so as to allow the cover means to be stacked either separately or when in a cover position with respect to an elevated work station.

* * * * *